United States Patent
Chauncey et al.

(10) Patent No.: US 10,037,711 B2
(45) Date of Patent: Jul. 31, 2018

(54) SYSTEM AND METHOD FOR IN-VEHICLE OPERATOR TRAINING

(75) Inventors: David C. Chauncey, Fairport, NY (US); Edward McCarthy, Pittsford, NY (US)

(73) Assignee: Vnomics Corp., Pittsford, NY (US)

(*) Notice: Subject to any disclaimer, the term of this patent is extended or adjusted under 35 U.S.C. 154(b) by 558 days.

(21) Appl. No.: 13/404,897

(22) Filed: Feb. 24, 2012

(65) Prior Publication Data

US 2012/0221216 A1    Aug. 30, 2012

Related U.S. Application Data

(60) Provisional application No. 61/446,778, filed on Feb. 25, 2011.

(51) Int. Cl.
*B60W 40/09* (2012.01)
*B60W 50/14* (2012.01)
(Continued)

(52) U.S. Cl.
CPC .......... *G09B 19/167* (2013.01); *B60W 40/09* (2013.01); *B60W 50/14* (2013.01); *G07C 5/0816* (2013.01);
(Continued)

(58) Field of Classification Search
CPC ... B60R 16/0236; B60W 40/09; B60W 50/14; B60W 2530/10; B60W 2540/10;
(Continued)

(56) References Cited

U.S. PATENT DOCUMENTS 5,877,961 A    3/1999 Moore
5,923,834 A    7/1999 Thieret et al.
(Continued)

FOREIGN PATENT DOCUMENTS

GB    2429088 A    2/2007
GB    2470147 A    11/2010
(Continued)

OTHER PUBLICATIONS

European Exam Report for EP 12 716 774.0 dated Mar. 11, 2014.
(Continued)

*Primary Examiner* — Stephen Holwerda
(74) *Attorney, Agent, or Firm* — Dinsmore & Shohl LLP

(57) ABSTRACT

An on-vehicle system for assessing an operator's efficiency of a vehicle, include sensors, an audiovisual display device, a processor and a data storage. The sensors measure or detect conditions of components of the vehicle, and convert the detected conditions into analog or digital information. The data storage stores program instructions, the analog or digital information from the sensors, and other data. The program instructions, when executed by the processor, control the on-vehicle system to determine a state of the vehicle within a vehicle's environment based on the analog or digital information from the sensors, determine whether one or more of a predetermined set of behaviors has occurred based on the determined state of a vehicle, assess performance of the determined one or more of the predetermined set of behaviors, and present the operator, via the audiovisual display device, a feedback based on the assessment.

42 Claims, 5 Drawing Sheets

(51) Int. Cl.
*G09B 19/16* (2006.01)
*G09B 19/14* (2006.01)
*G07C 5/08* (2006.01)

(52) U.S. Cl.
CPC ......... *G09B 19/14* (2013.01); *B60W 2530/10* (2013.01); *B60W 2540/10* (2013.01); *B60W 2540/16* (2013.01); *B60W 2550/12* (2013.01); *B60W 2550/143* (2013.01); *B60W 2750/40* (2013.01); *G07C 5/0841* (2013.01); *Y02T 10/84* (2013.01)

(58) Field of Classification Search
CPC ....... B60W 2550/12; B60W 2550/143; B60W 2750/40; B60W 2540/16; G07C 5/085; G07C 5/008
USPC ............... 340/439, 459, 460, 461, 462, 576; 701/22, 123; 702/179, 180, 182, 187, 702/188
See application file for complete search history.

(56) References Cited

U.S. PATENT DOCUMENTS

| | | | |
|---|---|---|---|
| 6,052,631 | A | 4/2000 | Busch et al. |
| 6,151,565 | A | 11/2000 | Lobley et al. |
| 6,161,101 | A | 12/2000 | Guinta et al. |
| 6,330,499 | B1 | 12/2001 | Chou et al. |
| 6,397,992 | B1 | 6/2002 | Patridge |
| 6,411,908 | B1 | 6/2002 | Talbott |
| 6,581,045 | B1 | 6/2003 | Watson |
| 7,649,445 | B2 | 1/2010 | Kuramori et al. |
| 2002/0143421 | A1 | 10/2002 | Wetzer |
| 2003/0004624 | A1 | 1/2003 | Wilson et al. |
| 2003/0063766 | A1 | 4/2003 | Goldslager et al. |
| 2003/0163489 | A1 | 8/2003 | Tonack et al. |
| 2004/0122722 | A1 | 6/2004 | Quintus et al. |
| 2005/0035862 | A1 | 2/2005 | Wildman et al. |
| 2005/0088299 | A1 | 4/2005 | Bandy et al. |
| 2007/0001831 | A1* | 1/2007 | Raz ..................... B60R 16/0231 340/439 |
| 2007/0027593 | A1* | 2/2007 | Shah ..................... B60W 50/00 701/29.4 |
| 2007/0198144 | A1 | 8/2007 | Norris et al. |
| 2007/0276582 | A1* | 11/2007 | Coughlin ............. B60W 40/09 701/123 |
| 2007/0283002 | A1 | 12/2007 | Bornhoevd et al. |
| 2008/0042489 | A1* | 2/2008 | Lewis ..................... B60K 6/48 303/152 |
| 2008/0120175 | A1* | 5/2008 | Doering .............. B60R 16/0236 705/14.67 |
| 2008/0255722 | A1* | 10/2008 | McClellan ............ B60R 25/102 701/31.4 |
| 2008/0319602 | A1* | 12/2008 | McClellan ............. G07C 5/008 701/31.4 |
| 2009/0051521 | A1* | 2/2009 | Crowe ..................... B60Q 9/00 340/461 |
| 2009/0070027 | A1 | 3/2009 | Newhouse |
| 2009/0157290 | A1 | 6/2009 | Ji et al. |
| 2010/0082228 | A1 | 4/2010 | Lee |
| 2010/0152941 | A1 | 6/2010 | Skaff et al. |
| 2011/0166773 | A1 | 7/2011 | Raz et al. |
| 2011/0205044 | A1 | 8/2011 | Enomoto et al. |
| 2012/0065874 | A1 | 3/2012 | Sato et al. |
| 2012/0191334 | A1 | 7/2012 | Kashio et al. |

FOREIGN PATENT DOCUMENTS

| | | |
|---|---|---|
| WO | WO 2005038613 A2 | 4/2005 |
| WO | 2008078088 | 7/2008 |

OTHER PUBLICATIONS

International Search Report and Written Opinion of the International Searching Authority, dated Jul. 25, 2012 in corresponding PCT/US2012/026591.
Eckenrode, R.T., "Weighting Multiple Criteria," Management Science 12(3):180-192 (1965).
Katsushige Onodera, "Effective Techniques of FMEA at Each Life-Cycle Stage," Proceedings of the Annual Reliability and Maintainability Symposium, pp. 50-56 (1997).
MIL-STD-1629A, "Military Standard. Procedures for Performing a Failure Mode, Effects and Criticality Analysis," Department of Defense, United States of America (Nov. 24, 1980).
Exam report for European application EP 12 716 774.0 dated Sep. 16, 2014.
Australian Examination Report dated Feb. 3, 2016 for Australian Application No. 2012246717.
European Search Report dated Oct. 27, 2015 issued in European Application No. 12716774.0.
Mexican Office Action for Mexican Application No. MX/a/2013/009628, dated Nov. 16, 2016 with translation, 8 pages.
Australian Examination Report for Australian Application No. 201246717, dated Nov. 16, 2016, 4 pages.
Non Final Office Action for U.S. Appl. No. 14/523,124, dated Dec. 2, 2016, 33 pages.
Final Office Action dated Oct. 18, 2017 in related U.S. Appl. No. 14/523,124 (19 pages).

\* cited by examiner

SYSTEM AND METHOD FOR IN-VEHICLE OPERATOR TRAINING

RELATED APPLICATIONS

This disclosure claims priority under 35 U.S.C. § 119 to U.S. Provisional Application No. 61/446,778 filed Feb. 25, 2011, the content of which is incorporated herein by reference in its entirety. In addition, U.S. Provisional Application No. 61/446,778 is related to U.S. Provisional Patent Application No. 61/420556, titled System and Method for Measuring and Reducing Vehicle Fuel Waste, filed on Dec. 7, 2010. The entire content of U.S. Provisional Patent Application No. 61/420556 is also incorporated herein by reference.

FIELD

This invention relates to improving the performance of vehicle operators.

BACKGROUND

Research and development toward improving fuel efficiency of vehicles has focused on vehicle components and systems. While operator performance might have a profound effect on a vehicle's fuel efficiency, little emphasis has been placed on improving operator skills This is due in part to the complexity of human behavior, vehicles, loads, and environmental conditions.

SUMMARY

Systems and methods disclosed herein assess the behaviors of an operator of a vehicle and dynamically adapt operator coaching to reduce fuel use, reduce vehicle maintenance cost and unsafe maneuvers. Exemplary embodiments constantly monitor the operation of a vehicle to provide real-time assessments of the operator based on the operator's performance, the vehicle' state, the vehicle's load and the environment in which the vehicle is operating. The assessments are used to provide in-vehicle coaching to the operator that is dynamically customized to the operator based on the vehicle's situation at that instant of time. The systems and methods according to exemplary embodiments described below assist operators to save fuel, reduce wear- and tear on the vehicle, and improve the safety of the operation of the vehicle. In addition, systems and methods according to exemplary embodiments can be used to monitor operator's compliance with regulations, e.g., federal regulations and company regulations. The federal regulations may include Hours of Service, Drive Time, Speed, Rest Periods and On Duty Times. The company regulations may include speed threshold, company PTO (paid time off) limits and company idling thresholds.

Some embodiments provide a method that includes determining the state of the vehicle within the vehicle's environment and determining whether one or more of a predetermined set of behaviors has occurred based on the current state of a vehicle, assessing the performance of the determined behavior, comparing the assessed performance to historical performance information of the operator, modifying an operator feedback threshold based on the result of the comparison, and presenting the operator feedback based on the feedback threshold.

Other embodiments provide a computer-readable storage medium having program instructions stored thereon that, when executed by a processor, cause a system to determine the state of the vehicle within the vehicle's environment; determine whether one or more of a predetermined set of behaviors has occurred based on the current state of a vehicle, assess the performance of the determined behavior, compare the assessed performance to historical performance information of the operator, modify an operator feedback threshold based on the result of the comparison, and present the operator feedback based on the adjusted feedback threshold.

Other embodiments provide an on-vehicle system including a sensor, an audiovisual display device, a processor and a data storage device storing program instructions and data. The program instructions, when executed by the processor, control the system to determine the state of the vehicle within the vehicle's environment; determine whether one or more of a predetermined set of behaviors has occurred based on the current state of a vehicle, assess the performance of the determined behavior, compare the assessed performance to historical performance information of the operator, modify an operator feedback threshold based on the result of the comparison, and present the operator feedback based on the adjusted feedback threshold.

In some of these embodiments, the predetermined set of behaviors includes running auxiliary equipment, excessive idle, progressive shifting, speeding, hard-braking, hard-acceleration and unsafe maneuver.

In some of these embodiments, the operator feedback threshold is incrementally changed based on the desired performance threshold for the behavior. The incremental change may be determined dynamically or based on a predetermined regimen.

In some of these embodiments, operator feedback is provided based on the situation at the current instant of time.

In some of these embodiments, the assessment and operator cueing may be performed substantially in real-time.

In some of these embodiments, the assessment of the behavior may be normalized based on vehicle's load, route, terrain and/or profile type.

In some of these embodiments, information related to the operator assessment is provided to a supervisor and/or a back-office system for use in tracking operator performance, providing training and/or reconfiguring the vehicle.

In some embodiments, alerts are sent to a supervisor when an operator repeatedly fails to comply with cueing.

DETAILED DESCRIPTION

Exemplary embodiments disclosed herein provide a system and a method that assesses the driving behaviors of an operator of a vehicle and dynamically adapts in-vehicle coaching to reduce fuel use, maintenance cost and unsafe maneuvers. The vehicle may be any type of transport having an operator (e.g., a driver or a pilot). The vehicle may be, for example, a ground vehicle, watercraft, aircraft or spacecraft that is used to transport passengers, mail and/or freight. The operator is an individual that controls the vehicle over an assessment period. In some embodiments, the assessment period may occur over part or all of a sortie. In terms of this disclosure a "sortie" is the period between the start of a trip at an origin location and the end of the trip at a destination location by a particular vehicle. The specific start and end of the sortie during the trip may be established based on time, distance, fuel use, etc.

Figure 1:
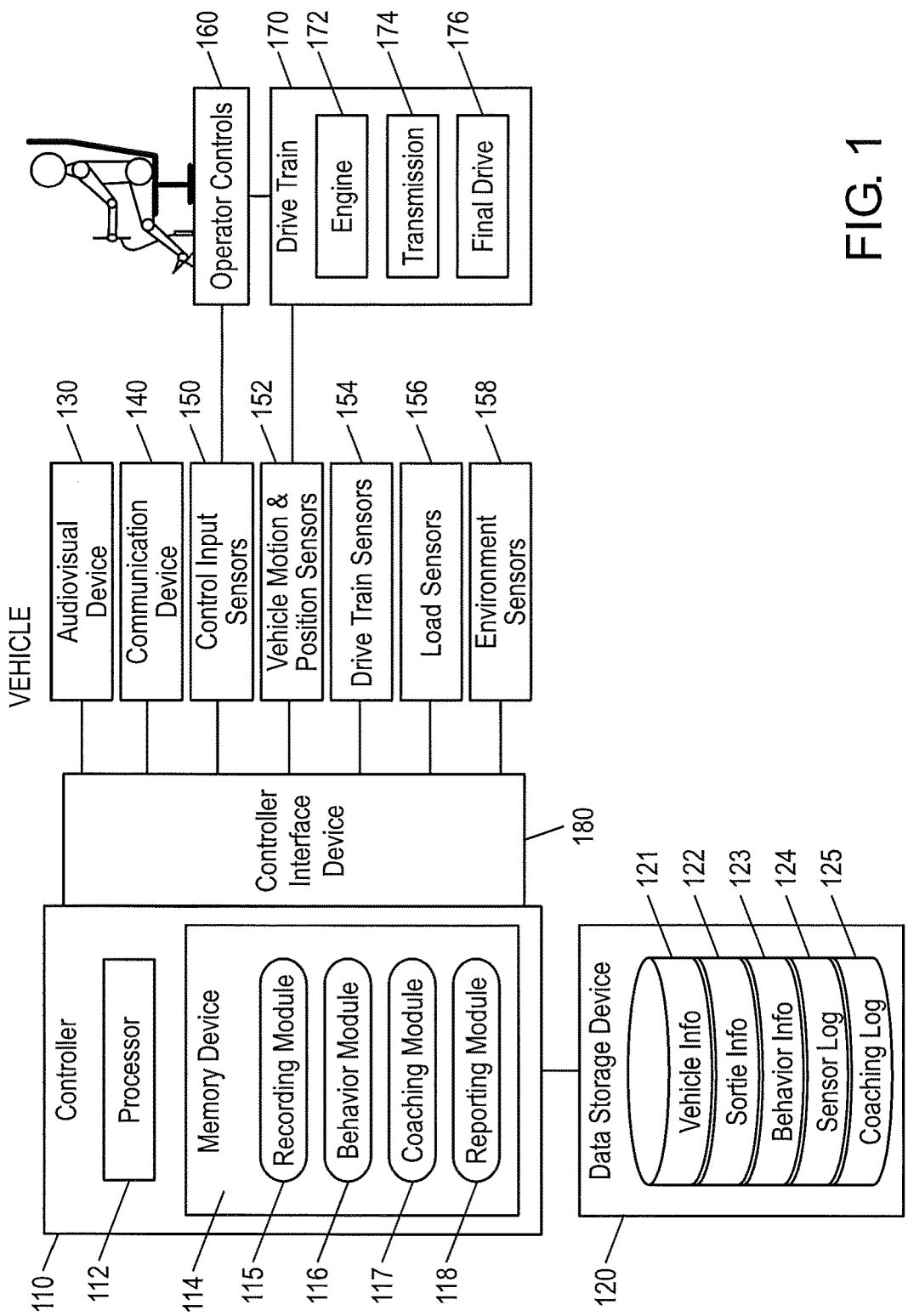
FIG. 1 is a block diagram illustrating an exemplary system.

FIG. 1 is a block diagram illustrating an exemplary vehicle in which embodiments consistent with the present disclosure may be implemented. The vehicle may include operator controls 160, a drive train 170, sensor devices including e.g., the control input sensors 150 and load sensors 156, an audiovisual device 130 and a communication device 140.

The operator controls 160 are any components of the vehicle that receive control inputs from the operator, such as, steering inputs (e.g., steering wheel, stick, yoke), braking inputs, trim inputs, throttle inputs and transmission inputs (e.g. gear selection). The drive train 170 includes vehicle components that transform fuel into kinetic energy to propel the vehicle. The drive train 170 may include an engine 172, a transmission 174 and a final drive 176 (e.g., drive wheels, continuous tracks, propeller, etc.). Sensors are devices that measure or detect real-world conditions and convert the detected conditions into analog and/or digital information that may be stored, retrieved and processed.

As shown in FIG. 1, the vehicle's sensors include control input sensors 150, vehicle position/motion sensors 152, drive train sensors 154, load sensors 156 and environment sensors 158. The control input sensors 150 detect and/or measure changes in the state of the control input devices. The vehicle motion/position sensors 152 detect and/or measure the vehicle's position, orientation, velocity, acceleration and changes in the state thereof. The drive train sensors 154 include devices that determine operating parameters of the engine and transmission. For example, the drive train sensors 154 may detect engine speed (e.g., RPM), engine power, torque, air flow, fuel flow and temperatures. The load sensors 156 are devices that determine or receive information of the weight and/or position of vehicle's current load. The load information can also include devices that determine tire pressure and temperature. The environment sensors 158 are one or more devices that detect or receive information of the environmental conditions in which the vehicle is operating. Conditions may include temperature, humidity, barometric pressure, precipitation, wind speed, wind direction. The operating parameters may include gear selections, and a rear end ratio. A rear-end ratio set on vehicles (e.g., trucks) can be changed for load. For example, for a heavier load, the rear end ratio should be set lower. When the transmission cannot the changed, the rear end ratio can be changed according to load.

The motion/position sensors 152 may include accelerometers that measure acceleration (translational or angular) and from which its speed and position in any dimension (linear and angular) can be derived. Some or all of the motion/position sensors 152 may be provided by an inertial measurement unit (IMU), which is an electronic device that measures and reports on a vehicle's velocity, orientation and gravitational forces, using a combination of accelerometers and gyroscopes without the need for external references. Additionally, the motion/position sensors 152 may be provided by a global positioning system (GPS) navigation device. GPS devices provide latitude, longitude information, altitude and directional velocity information. The vehicle may also include speed sensors that detect the speed of the vehicle. Based on the speed, the sensor may also detect the distance traveled by the vehicle (e.g., odometer). Additionally or alternatively, wheel speed sensors may be located on the wheels, the vehicle's differential, or a pitot tube may measure the velocity of air with respect to the motion of the vehicle.

The audiovisual device 130 generates visual and aural cues that present the operator with feedback and coaching. The audiovisual device 130 may include a video display, such as a liquid crystal display, plasma display, cathode ray tube, and the like. The audiovisual device 130 may include an audio transducer, such as a speaker. Furthermore, the audiovisual display may include one or more operator-input devices, such as bezel keys, a touch screen display, a mouse, a keyboard and/or a microphone for a voice-recognition unit. Using the audiovisual device 130, information obtained from the vehicle's sensors may be used to provide feedback to the operator indicating driving actions that should have been taken. The audiovisual device 130 also presents dynamically generated reports of sensor and/or coaching information to the operator.

The communication device 140 sends and/or receives information from the vehicle over one or more communication channels to other vehicles, a remote supervisor, and/or a remote server (not shown). The communication device 140 may provide, for example, information collected by the sensors and reports generated by the fuel tracking system describing fuel use, fuel wasted, operator performance and vehicle performance to a back-office server (not shown).

The communication device 140 may use wired, fixed wireless, or mobile wireless information networks that communicate by a variety of protocols. The networks may comprise any wireless network, wireline network or a combination of wireless and wireline networks capable of supporting communication by the vehicle using ground-based and/or space-based components. The network can be, for instance, an ad-hoc wireless communications network, a data network, a public switched telephone network (PSTN), an integrated services digital network (ISDN), a local area network (LAN), a wide area network (WAN), a metropolitan area network (MAN), all or a portion of the Internet, and/or other communication systems or combination of communication systems at one or more locations. The network can also be connected to another network, contain one or more other sub-networks, and/or be a sub-network within another network.

The controller 110 may be one or more devices that exchange information with the sensors, the memory device 140, the data storage device 120, the audiovisual device 130 and/or the communication device 140. The controller 110 includes a processor 112 and a memory device 140. The processor may be a general-purpose processor (e.g., INTEL or IBM), or a specialized, embedded processor (e.g., ARM). The memory device 140 may be a random access memory ("RAM"), a read-only memory ("ROM"), a FLASH memory, or the like. Although the memory device 140 is depicted as a single medium, the device may comprise additional storage media devices. In some embodiments, the controller 110 is a stand-alone system that functions in parallel with other information processing devices (e.g., a mission computer, engine control unit or cockpit information unit) operating on the vehicle. In other embodiments, the functions of the controller 110 may be incorporated within one or more other information processing devices on the vehicle.

The controller 110 processes information received from the sensors to determine the occurrence of predetermined behaviors, and provides adaptive coaching to the operator using the audiovisual device 130. In addition, the controller 110 provides reports to the operator via the audiovisual device 130, or the operator's supervisor or a back-office server via the communication device 140.

The data storage device 120 may be one or more devices that store and retrieve information, including computer-readable program instructions and data. The data storage device 120 may be, for instance, a semiconductor, a magnetic or an optical-based information storage/retrieval device (e.g., flash memory, hard disk drive, CD-ROM, or flash RAM).

The controller 110 interface device may be one or more devices for exchanging information between the host and the devices on the vehicle. The controller interface device 180 may include devices operable to perform analog-to-digital conversion, digital-to-analog conversion, filtering, switching, relaying, amplification and/or attenuation. Furthermore, the controller interface device 180 may store the received information for access by the processor. In some embodiments, the data interface includes a diagnostic data port, such as a J1708, J1939 and/or OBDII bus interfaces as described in the Society of Automotive Engineers SAE International Surface Vehicle Recommended Practice.

The program instructions executed by the controller 110 may be recorded on the data storage device 120 and/or the memory device 140. As shown in FIG. 1, the instructions include a recording module 115, a behavior module 116, a coaching module 117 and a reporting module 118. The recording module 115 configures the controller 110 to obtain and store information provided by the sensors. The behavior module 116 configures the controller 110 to receive information provided by the recording module 115 and determine whether one or more predetermined behaviors have occurred. In order to determine whether one or more predetermined behaviors have occurred, the behavior module 116 compares the current practice of the operator with best practices for given circumstances. The coaching module 117 configures the controller 110 to assess the determined behaviors, adjust cueing thresholds and generate operator feedback using the audiovisual device 130. The reporting module may configure the controller 110 to generate documents including information from the recording module 115, the behavior module 116 and the coaching module 117. The generated documents may be stored in the data storage device 120.

The behavior module 116 may identify both positive and negative behaviors. Positive behaviors (e.g., successful progressive shifting) may cause the coaching and reporting modules to generate reward-oriented events, including positive operator cues, assessments and indicators of advancement (e.g., rankings, promotions, rewards). The negative (i.e., wasteful or dangerous) behaviors may cause the coaching and reporting modules to generate detrimental events, such as negative operator cues, assessments and indicators of deficiency (e.g., lower rankings, demotions, disincentives).

The data storage device 120 stores information referenced by the program modules, including vehicle information 121, operator information, sortie information 122 and behavior information 123. The vehicle information 121 describes the configuration of the vehicle, its predetermined thresholds and operating strategies. For instance, the vehicle information 121 may include a vehicle identifier, a vehicle type, a make, a model, vehicle options, vehicle age, defects and maintenance history. In addition, the vehicle information 121 may store information about the drivetrain, including: engine type, size, power, power curve, recommended/ideal idle speed, threshold speeds, optimal engine speed for the gears in the transmission and/or a map of the recommended/ideal shift patterns for the transmission. Furthermore, the vehicle information 121 includes information defining how the vehicle should be operated in different situations (e.g., rules and information defining different shift strategies).

The sortie information 122 describes a sortie during which the operator is assessed and coached. The sortie profile information may include a sortie type, a sortie description and a load description. In addition, the sortie information 122 may identify the sortie's predetermined limitations such as the maximum allowed speed, maximum distance, maximum time, maximum number of stops and maximum load weight. The sortie description may also include a predefined route, waypoints, schedules, maximum speeds and loads for the sortie.

Based on the vehicle information 121 and sortie information 122, operator assessments of can be normalized to enhance the comparability of the result. For instance, assessments of different operators can be normalized for comparison based on the vehicle type, route type and/or operating conditions for comparison to other operators.

The behavior information 123 includes parameters that determine whether the operator has performed one of the predetermined behaviors. The behavior information 123 may store information against which the behavior module 116 compare sensor information captured by the recording module 115, including thresholds, datasets, multidimensional databases and algorithms. For instance, the behavior module 116 may determine that a behavior has occurred when the magnitude and duration of an accelerometer output corresponds to a range included in a lookup table.

Coaching information is information stored in the data storage device 120 for reference by the coaching module 117 when assessing an operator's determined behaviors. The coaching information may also include thresholds, datasets, multidimensional databases, and algorithms defining desired and/or optimal behaviors (e.g., fuel, safety and regulatory compliance). For example, the coaching information may include engine speed thresholds corresponding to desired transmission gear-changes. Operator assessment scores and cueing thresholds may be determined based on the difference between the engine speed of the operator's gear-change and the desired engine speed thresholds stored with the coaching information.

The data storage device 120 may store logs of information generated during the sortie, including a sensor log 124 and a coaching log 125. The sensor log 124 may record information provided by the sensors in association with a corresponding time frame. The time frame can be tied back to a location and the circumstances surrounding an event (e.g., fast steering to go around a tight curve). The sensor information may, together, define the state of the driver, the vehicle, the load and the environment within a particular time frame. A time frame is a block of time that is one of a series that span the duration of the sortie. The length of the time and the rate at which the time frames are recorded may be chosen to provide different levels of detail regarding the operator's behaviors. The time frame may be, for example, 1/60th of second, one-second, ten-seconds, etc.

The coaching log 125 is a record of the operator's behaviors that occurred during a sortie. As described below, the behavior module 116 determines whether predetermined behaviors have occurred. The determined behaviors may be stored in the coaching log 125 along with associated information, such as the corresponding sensor information, operator assessment (e.g., a score or rating) and an associated cost of the behavior, such as fuel-wasted. The fuel wasted may be determined based on categorizing the fuel used as described in related U.S. Provisional Patent Application No. 61/420556. For instance, with regard to a hard-acceleration behavior, the coaching log 125 may include records describing past occurrences of hard-braking, including the time of the event, an assessment of the event (e.g., rating, score) and/or associated sensor information (RPM, gear, acceleration, velocity and duration).

The operator is assessed based on the operator's actual behavior at within a time frame when compared with a desired behavior determined for that time frame. The desired behavior is determined by the system based on the current situation, including the driver's behavior, the state of the vehicle, the vehicle's load and the environmental conditions. The operator assessment for a particular time frame may be directly correlated to a cost savings. For example, an assessment for a time frame may be 3.5 points out of a possible 4.8 points. The difference, 1.3 points, may be correlated to a fuel savings. Alternatively or additionally, an operators assessment may be based a number of events within a window. For example, the number of hard-braking events within an hour or within a mile of travel.

The information in the sensor log 124 and the coaching log 125 may be retrieved by the coaching module 117 to dynamically determine positive and negative events, and to generate reports of an operator's performance during a sortie. For example, automatically or on request, the coaching module 117 may retrieve one or more datasets from the logs for presentation to the operator on the audiovisual device 130 or for transmission to a remote supervisor.

Figure 2:
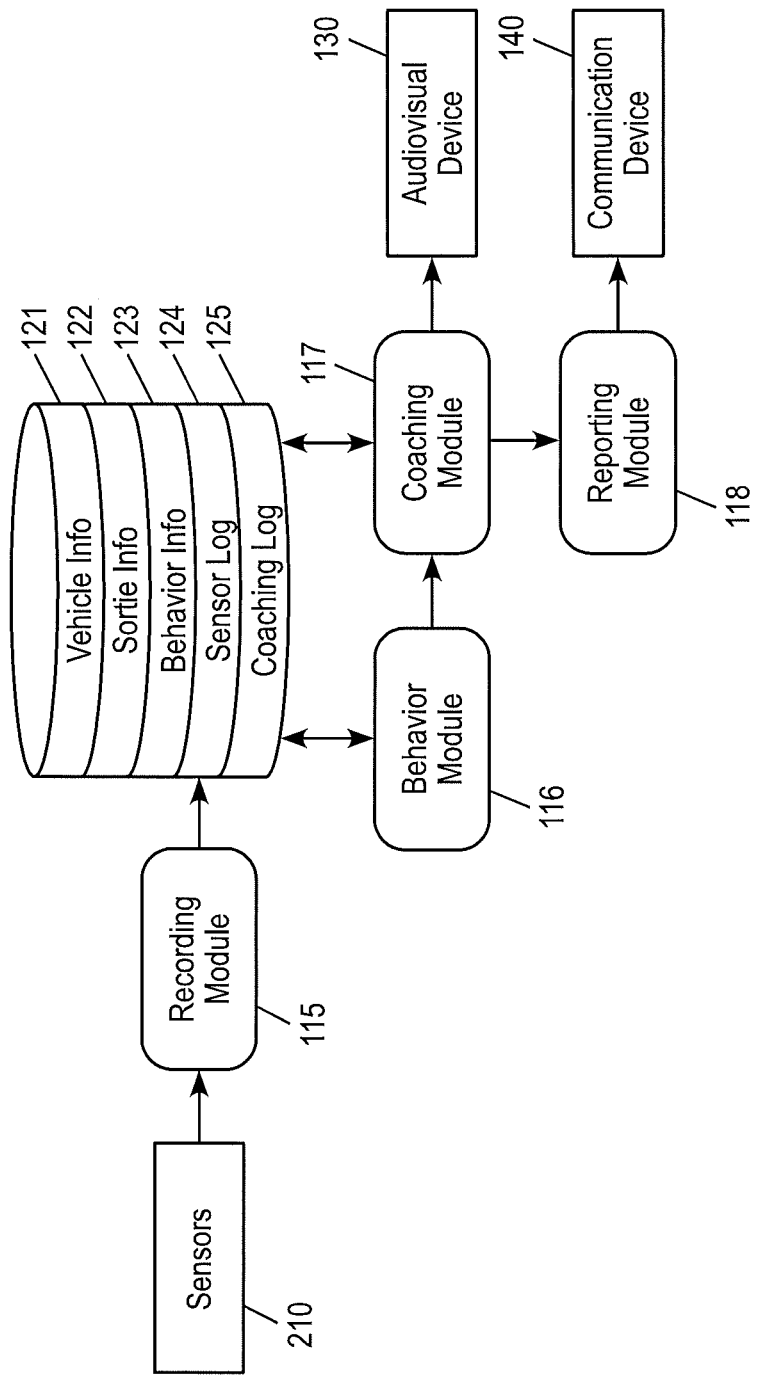
FIG. 2 is a functional diagram of the exemplary system.

FIG. 2 is an exemplary functional block diagram illustrating relationships between the elements of the vehicle illustrated in FIG. 1. The recording module 115, when executed by the processor, causes the controller 110 to obtain information from the vehicle's sensors 210. The sensors 201 may include control input sensors 150, vehicle motion/position sensors 152, drive train sensors 154, load sensors 156 and environment sensors 158. As described above, the sensor information may be recorded over a number of time frames and each record may be identified to a corresponding one of the time frames.

The behavior module 116 causes the controller 110 to obtain sensor information and determine whether one or more of a number of predetermined behaviors has occurred or is occurring. The sensor information may include information of the following: the control input states (e.g., steering, braking and throttle), the vehicle state (e.g., positions, velocities and accelerations) and the drive train state (e.g., engine speed, gear, fuel flow and air flow). The behavior determination may be based on behavior information 123 stored in the data storage, which may include algorithms, datasets (e.g., look-up tables) and thresholds. For instance, when the sensor information indicates that the vehicle has exceeded a predetermined acceleration value stored in the behavior information 123 for more than a predetermined number of time frames, the behavior module 116 may determine that the operator has caused an excessive acceleration to occur.

The coaching module 117 causes the controller 110 to assess the operator's behaviors and to dynamically adjust thresholds that are used to provide positive and negative feedback to the operator. The coaching module 117 may assess the detected behaviors based on the coaching information describing desired behavior parameters. An assessment of a particular behavior may be used to generate a score for the behavior and/or to modify an overall operator's score for a sortie. For instance, the coaching module 117 may generate a shift score that is calculated and displayed to the operator by the audiovisual device 130 and/or transmitted to the operator's supervisor via the communication device 140. In some cases, the behavior information 123 and/or the sortie information 122 may be used to normalize the operator assessment for comparison to other operators in a group (e.g., a fleet).

Using the assessment, the coaching module 117 may dynamically adjust parameters for determining behaviors, providing audiovisual cueing and allocating positive/negative results for a particular operator. In some embodiments, the coaching module 117 determines whether to adjust the parameters based on a comparison of the operator's detected behaviors with one or more previous behaviors of the same type. The comparison may be made using the determined behavior's corresponding sensor information or score. If the comparison shows the operator's behavior has sufficiently improved over time and/or a number of occurrences, the coaching module 117 may incrementally modify the operator's corresponding parameters for providing cueing or generating positive/negative events. The incremental changes may be predetermined, based on a predetermined training regime, or dynamically based on the assessment, For example, in the case of a hard-braking behavior, if the operator successfully performs the behavior five successive times without triggering a hard-braking warning by the coaching module 117, the coaching module 117 may modify the operator's thresholds such that the warning is generated at a lower deceleration rate. In addition, if the coaching module 117 determines that the operator successfully performed five braking behaviors sequentially, the coaching module 117 may modify the operator's corresponding parameters such that ten braking are required to generate a subsequent positive event.

The reporting module may cause the controller 110 to obtain information from the sensor log 124 and the coaching module 117 to generate a report of the vehicle's and the operator's performance during the sortie. The reporting module may dynamically generate information for presenting sensor, behavior and coaching information to the operator via the audiovisual device 130. The reporting module may also generate reports including some or all of this information and provide the reports to the operator's supervisor and/or a back office server via the communication device 140.

The components of the vehicle illustrated in FIGS. 1 and 2 are exemplary. Vehicles and systems consistent with this disclosure are not limited to the components and arrangements shown. Components may be added, removed, combined and/or rearranged without departing from the scope of the functions disclosed herein.

Figure 3:
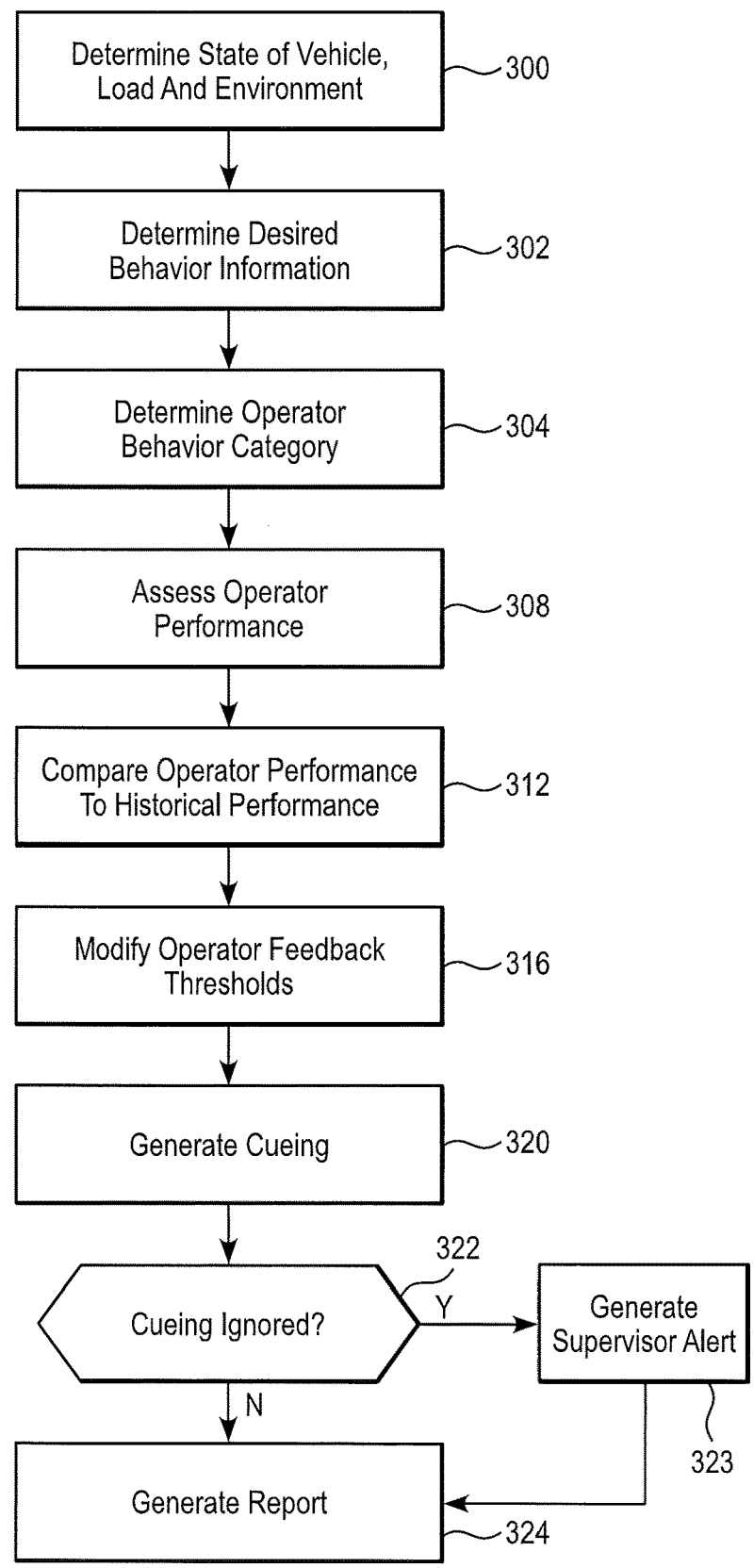
FIG. 3 is a flow chart illustrating an exemplary coaching process.

FIG. 3 is a flow chart illustrating an exemplary process for providing adaptive operator assessment and coaching. The recording module 115 determines the vehicle's state based on information from the sensors. (Step 300) The vehicle's state may include the following information: power state (e.g., engine on/idle/off, air conditioning unit on/off, refrigeration unit on/off and auxiliary equipment on/off), control input state (e.g., throttle position, transmission selection, steering position and braking position), position/velocity state (e.g., moving/stationary, position, velocity, acceleration, pitch, yaw, altitude), drive train state (e.g. engine speed, wheel speed, fuel flow rate and air flow), load state (e.g., weight) and environmental states (e.g., temperature, humidity, pressure, wind speed, wind direction and precipitation).

Based on the sensor information, the vehicle information 121 and the sortie information 122, the behavior module 116 determines desired behavior information 123. (Step 302) The desired behavior information 123 may include the behavior module's 116 determination of the most fuel-efficient behavior for the vehicle's sensors at the current time frame given the sensor information, the vehicle information 121 and the sortie information 122. For example, if the vehicle is stationary, the most fuel-efficient behavior for the vehicle may be to have the engine idle below a predetermined threshold speed. If the vehicle is cruising at a substantially steady speed, the most fuel efficient behavior may be to have the vehicle's transmission set at a gear that provides lowest amount of power required to sustain the current speed. The desired optimal behavior determination may be made in real-time or in near real-time. For example, the determination of an optimal behavior for a particular time frame may be determined and as sensor information is received.

In addition, the behavior module 116 determines whether one or more of the predetermined behavior categories has occurred and/or is occurring. (Step 304) The behavior categories include one or more undesired or desired behaviors that is tracked, assessed and reported by the system. The occurrence of a particular behavior category may be determined when the determined state of the vehicle in one or more time frames satisfies the parameters of the behavior. Behavior determination may occur in real-time or in near real-time such that the behaviors are identified and assessed as they occur. In addition, the behavior module 116 may predict operator behaviors, for example, based on the conditions of the vehicle. Furthermore, once a behavior category is detected, the behavior module 116 may interpret the behavior category to be ongoing so long as the sensor information in a substantially unbroken series of time frames satisfies the behavior's parameters.

The predetermined behavior categories may include the following: running auxiliary equipment, excessive idle, progressive shifting, speeding, hard-braking, hard-acceleration and unsafe maneuver. Unsafe maneuver may include cornering too fast, following too close, and changing lanes too quickly. The parameters describing these behaviors may be stored, for example, as behavior information 123 in the data storage device 120.

Figure 5A:
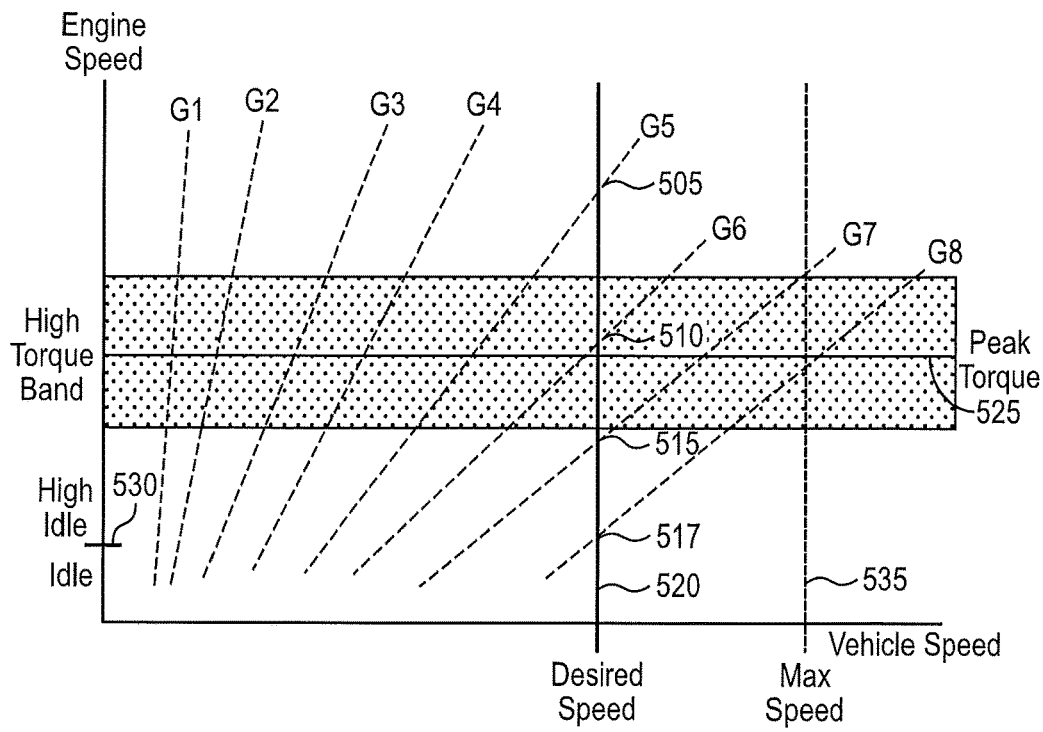
FIGS. 5A and 5B illustrate exemplary vehicle information associating a vehicle speed with engine speed.
Figure 5B:
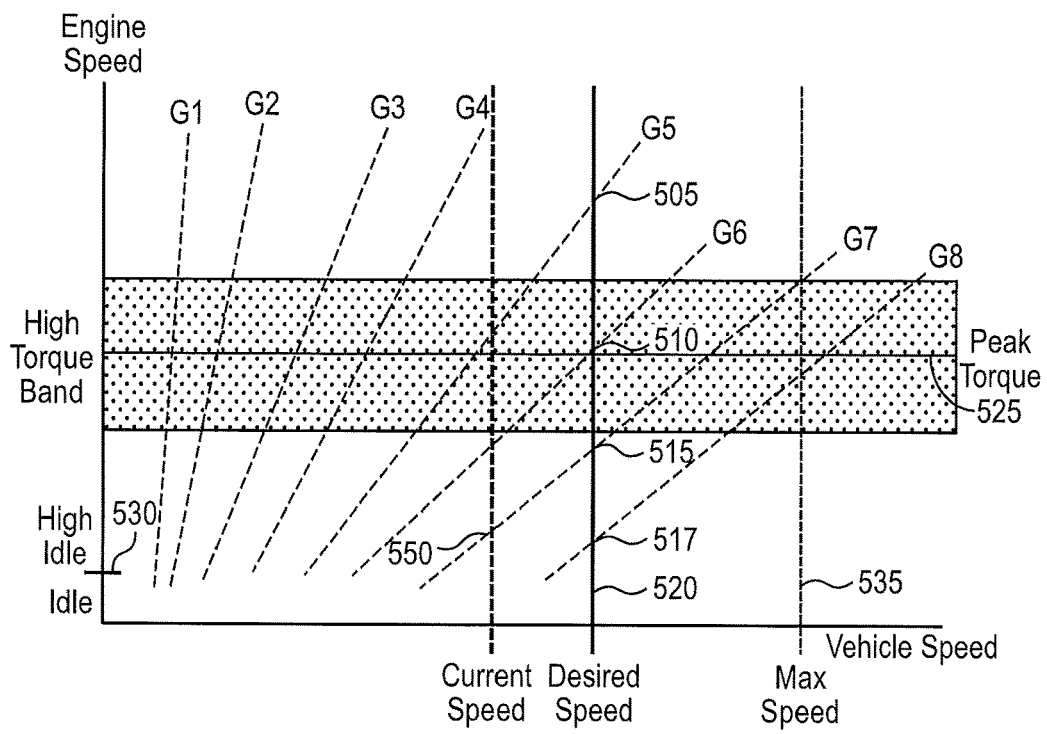

"High-idle" occurs when in the vehicle is stationary (e.g., based on GPS, speed, INS) and the engine speed is above a predetermined threshold, such as the high-idle threshold 530 (e.g., 800 RPM) illustrated in FIGS. 5A and 5B. "Running auxiliary equipment" refers to running auxiliary equipment, e.g., A/C, of the vehicle. "High-idle" and "Running auxiliary equipment" are often associated with each other. "Excessive idle" occurs when vehicle is stationary, the engine speed is below the high-idle threshold (as illustrated in FIGS. 5A and 5B) but the vehicle has been stationary for a continuous span of time that is longer than an excessive-idle time threshold. "Progressive Shifting Lo/High" are behaviors that occur when the operator selects a new transmission gear and the engine speed is outside a predetermined efficient range, such as the peak torque range 525 illustrated in FIGS. 5A and 5B. "Excessive speeding" occurs when vehicle's speed exceeds a predetermined top speed threshold, such as the maximum speed threshold illustrated in FIGS. 5A and 5B. "Hard-acceleration" occurs when the vehicle accelerates in its direction of travel at more than a predetermined rate and/or for more than a predetermined period of time. "Hard-braking" occurs when vehicle decelerates in its direction of travel at more than a predetermined rate and/or for more than a predetermined period of time. An "unsafe maneuver" occurs when the vehicle undergoes accelerations (rotational and/or linear) that depart from the direction of travel at more than a predetermined rate. For instance, where the vehicle is a truck, an unsafe maneuver may be an excessively fast lane change that causes to truck to accelerate laterally and/or rotationally at greater than 9.8 meters per second (i.e., 1 G).

The coaching module 117 assesses the operator's performance based on the state of the vehicle in a time frame, the desired behavior for the time frame and/or the determined behavior categories determined in the time frame. (Step 308) The difference between the current state of the vehicle and its desired state can be used to provide one or more measures of the operator's performance (e.g., a rating or a score). For instance, the coaching module 117 may compare the magnitude and/or duration of a behavior with corresponding desired behavior information 123. In one example, the vehicle's acceleration within a time frame may be measured by an accelerometer. That acceleration of the vehicle may be compared against a desired acceleration defined in by a threshold, a range or a profile. A score may be given to the operator based on the degree of conformance between the detected acceleration and the desired acceleration. In another example, the coaching module 117 may determine difference between the engine speed in the time frame during which a gear change is detected and the desired engine speed determined for the gear change based on the vehicle's current situation (e.g., vehicle state and environmental state). A score may be assigned to the gear change behavior based on the difference between the detected and the desired engine speeds, as well as the amount of time the speed is above the desired value.

The disclosed embodiments are not limited to the examples above and other methods of scoring are known in the art and the coaching module 117 may use any scoring method appropriate to a particular behavior or vehicle mode. Furthermore, the operator's score may be normalized to account for difference in the vehicle information 121 and/or sortie information 122. For instance, the coaching module 117 may normalize an operator's score using for the vehicle's load, route, terrain profile, and vehicle information for comparison to other operator having different vehicles, loads, routes, terrains and/or profile types.

The coaching module 117 compares the behaviors determined by the behavior module 116 with previous, corresponding behaviors recorded in, for instance, the coaching log 125. (Step 312) The comparison may be based on the magnitude and/or the duration of the detected behavior. Alternatively or additionally, the comparison may be based on the assessment (e.g., score of the behavior). Using the behavior comparisons, the coaching module 117 may modify the cueing thresholds for the operator. (Step 316) If the current behavior is not an improvement over one or more previous behaviors, the coaching module 117 may leave the cueing threshold for that behavior unchanged. If the current behavior is an improvement over a predetermined number of previous, corresponding behaviors, the coaching module 117 may adjust the cueing threshold closer to the desired behavior value. In this way, the cueing is progressively adapted based on the operator's specific behaviors towards the desired behaviors.

The coaching module 117 generates cueing on the audio-visual display device(s) using the thresholds determined by the coaching module 117. (Step 320) If it is determined that the cueing is ignored by the operator, an alert can be generated and sent to a supervisor in a remote location. (Steps 322 and 323) Furthermore, the reporting module 118 generates reports based on the determinations by the coaching module 117. The reports may be one or more documents including some of all of the information generated by the recording module 115, determination module and/or coaching module 117. (Step 324) The reporting module may provide the report to the operator in the vehicle, a remotely-located supervisor or a back-office server, via the communication device 140.

In one example, the controller 110 may provide the operator with cueing related to progressive shifting. The recording module 115 may obtain information from the sensors indicating that the vehicle is moving, that the operator has selected a new transmission gear and the current engine speed (e.g., RPM). Based on the sensor information and the stored behavior information 123, the behavior module 116 may determine that a progressive shift behavior has occurred. This determination may be stored in the coaching log 125 along with the corresponding sensor information.

The coaching module 117 may assess the determined progressive shift behavior by comparing the sensor information with corresponding information stored in the coaching information describing desired ranges for progressive shifting recommended to maximize the vehicle's fuel economy. The coaching module 117 may determine an assessment for the gear shift based on the difference between the engine speed after the operator's gear selection and the desired engine speed. The coaching module 117 may also take into account the number of time frames in which the engine speed exceeds the desired value.

The coaching module 117 may then determine whether to adjust the operator's cueing thresholds based on the desired progressive shift behavior value and the operator's previous shift behaviors stored in the coaching log 125. Using the stored information and/or the assessment, the coaching module 117 may modify, dynamically, an established shift threshold for the particular operator. In the event the operator shifts below the determined threshold for either a predetermined number of shifts/predetermined amount of time, the feedback threshold is changed until it reaches the desired speed threshold. The coaching module 117 may generate visual and/or aural feedback based on the determined threshold. Additionally, the determined score and threshold may be provided to the reporting module for reporting to the operator, the operator's supervisor or a back-office.

In another example, the behavior module 116 may determine that a hard-braking behavior has occurred based on sensor information indicating that the vehicle's brake is applied and/or the rate of the vehicle's deceleration. An assessment of operator's performance (e.g., score) with regard to the detected behavior may be determined based on the detected deceleration and coaching information identifying a deceleration threshold limit. Based on the operator's determined score, the operator's threshold value may be dynamically updated. Using the operator's score and/or the determined threshold, the coaching module 117 may provide visual and/or aural feedback to the operator via, for example, the audiovisual device 130. Likewise, the coaching module 117 may generate and/or update reports based on the foregoing information.

Figure 4:
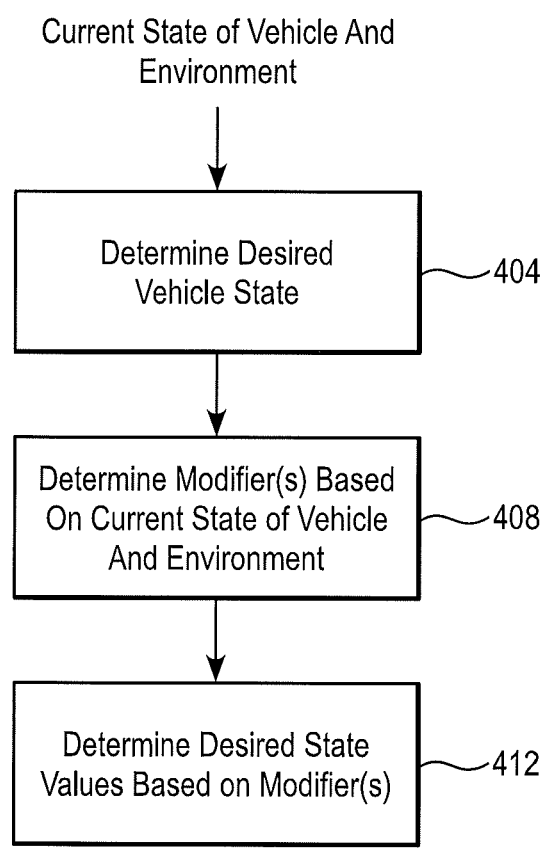
FIG. 4 is a flow chart illustrating an exemplary process for determining optimal behavior information.

FIG. 4 is a flow chart illustrating an exemplary process for determining desired behavior information 123. The behavior module 116 determines the desired state of the vehicle within a particular time frame based on the state of the vehicle detected by the sensors and the state of the vehicle's environment. (Step 404) In determining the desired state of the vehicle, the behavior module 116 may reference the vehicle information 121 and the sortie information 122 stored in the data storage device 120. According to one example, the behavior module 116 determines the desired gear selection for the case where the vehicle is cruising at a substantially consistent speed. The sortie information 122 can indicate that the maximum allowed speed at the vehicle's current location is 55 M.P.H. Furthermore, the power curves for the vehicle's drive train may indicate that a particular gear (e.g., G8) should provide the greatest fuel efficiency for cruising at the desired speed.

FIG. 5A illustrates an exemplary set of vehicle power curves associating engine speed and vehicle speed for several gear selections. If the "desired speed" 520 obtained by the behavior module 116 is 55 M.P.H., FIG. 5A illustrates that four gear selections G5, G6, G7, G8 can power the vehicle at the desired speed 520. Based on FIG. 5A, gear selections G1, G2, G3, G4 cannot power the vehicle at the desired speed 520. Points 505, 510, 515 and 517 indicate the engine speed corresponding to gear selections G5, G6, G7, G8 for cruising at the desired speed 520. Because the engine speed for gears G5-G7 is greater than for G8, the fuel flow should be higher. Accordingly, the behavior module 116 may determine that gear G8 is the desired gear selection for cruising at the desired speed 520.

The behavior module 116 determines modifiers of the desired state based on the current state of the vehicle and/or the environment. (Step 408) For instance, gear G8 may be the most desirable selection for cruising under default conditions. However, if the position/velocity information indicates that the vehicle is currently headed uphill, the vehicle is carrying a heavy load and/or the vehicle is headed into a strong headwind, then additional power may be required to continue cruising at the given speed (e.g., 55 MPH). Accordingly, the behavior module 116 may increase/decrease the desired gear selection to account for the additional power and/or torque necessary to the maintain the desired speed.

Referring back to FIG. 5A, the behavior module 116 may determine the additional amount of torque is required based on the detected load of the vehicle. This determination may be based on algorithms and/or look-up tables the provide a modifier value (e.g., a multiplier or a addition) to the torque of provided by the drive train at the default gear selection. For instance, for a particular load value, the behavior module 116 may determine that an additional ten percent more torque over that produced by the default gear selection is required to maintain the desired speed 520. FIG. 5A also illustrates the current speed 535 of the vehicle, and the max speed 535. Based on the vehicle's power curve and gearing information, the behavior module 116 may determine that the additional torque is provided by selecting gear G7 rather the gear G8. Accordingly, the behavior module 116 may determine that a desired behavior for the vehicle's current state is gear G8.

The modified values determined based on the vehicle's situation are identified as the desired state information for the vehicle. (Step 412) The engine speed and fuel flow corresponding to operating in gear G8 at the desired speed 520 would, therefore, be identified the modified values of the desired state for the time frame from which the operator's deviations would be measured and assessed for the purposes of coaching and reporting.

FIG. 5B illustrates another example of determining a desired behavior based on the vehicle's power curves. According to the example in FIG. 5B, the current speed 550 of the vehicle is below the desired speed 520. Thus, the desired behavior would accelerate the vehicle to the desired speed 520. For each time frame during the period of acceleration up to the desired speed 520, the desired behavior information 123 may be determined and compared to the actual state of the vehicle.

FIG. 5B illustrates an time frame in which the "current speed" 550 of the vehicle may be 35 MPH and the desired speed may be may be 55 MPH. The sensor information for the current vehicle state may indicate that the selected gear G7. Thus, in the current instant, the desired behavior would be to select an gear for efficiently accelerating the vehicle to the desired speed. Based on the power map for the drive train stored in the vehicle information 121, the behavior module 116 may determine the desired gear selection. As shown in FIG. 5B, in this example, the gear G5 would be the desired gear because it would provide the greatest torque 525 required for accelerating the vehicle in the current situation. Furthermore, because no other gear selection would provide greater torque, the behavior module 116 would not identify a modifier based on, e.g., the state of the vehicle (e.g., load, pitch) or the environment (e.g., headwind).

While the examples illustrated in FIGS. 5A and 5B, and discussed above are directed to determining desired behaviors for the vehicle's speed based on the vehicle's current situation, the same or similar methods may be applied to various behaviors, such as acceleration, deceleration, braking and other such maneuvers controlled by the operator. Furthermore, these examples describe modifiers that are determined based on load and winds. However, one or more modifiers can be determined based on other vehicle and environmental state information recorded by the sensors. Some or all of the state information can be weighted and/or combined to provide a single modifier for the determined desired state information.

As disclosed herein, embodiments and features can be implemented through computer hardware and/or software. Other embodiments of the invention will be apparent to those skilled in the art from consideration of the specification and practice of the embodiments of the invention disclosed herein. Further, the steps of the disclosed methods can be modified in any manner, including by reordering steps and/or inserting or deleting steps, without departing from the principles of the invention. It is therefore intended that the specification and embodiments be considered as exemplary only.

What is claimed is:

1. An on-vehicle system for assessing operational efficiency of an operator of a vehicle, the system comprising:
   a plurality of sensors configured to measure or detect, for each time frame in a series of time frames, conditions of components of the vehicle, and convert the detected conditions into analog or digital information,
   an audiovisual display device;
   a processor; and
   a data storage storing program instructions, the analog or digital information from the sensors, and other data;
   wherein the program instructions, when executed by the processor, control the on-vehicle system to determine, for each time frame of the series of time frames, a desired behavior of the operator from a predetermined set of behavior categories based on a current operational efficiency of the vehicle determined from the analog or digital information from the sensors, the desired behavior configured to vary from a first time frame to a second time frame based on the current operational efficiency of the vehicle; determine, for each time frame in the series of time frames, the current behavior of the operator from the predetermined set of behaviors based on the current operational efficiency of a vehicle in that time frame; assess performance of the operator for each time frame in the series of time frames, based on a difference between the determined desired behavior of the operator for each time frame and the determined current behavior of the operator for each time frame; and present the operator, via the audiovisual display device, a feedback based on the assessed performance, and to compare the assessed performance to historical performance information of the operator, modify an operator feedback threshold based on the result of the comparison, and present the operator the feedback at least partly based on the adjusted feedback threshold, wherein the operator feedback threshold is incrementally changed based on a desired performance threshold.

2. The on-vehicle system according to claim 1, wherein the predetermined set of behaviors includes running auxiliary equipment, excessive idle, progressive shifting, speeding, hard-braking, hard-acceleration and unsafe maneuver.

3. The on-vehicle system according to claim 1, wherein the incremental change is determined dynamically or based on a predetermined regimen.

4. The on-vehicle system according to claim 1, wherein the feedback is provided to the operator based on a situation at the current instant of time.

5. The on-vehicle system according to claim 1, wherein the assessment is performed substantially in real-time.

6. The on-vehicle system according to claim 1, wherein the program instructions include a recording module, a behavior module, a coaching module and a reporting module.

7. The on-vehicle system according to claim 6, further comprising a controller, wherein the recording module configures the controller to obtain and store information provided by the sensors.

8. The on-vehicle system according to claim 6, wherein the data storage stores coaching information for reference by the coaching module, wherein the coaching information include thresholds, datasets, multidimensional databases, and algorithms defining desired operator behaviors.

9. The on-vehicle system according to claim 6, wherein the coaching module configures the controller to retrieve information from a sensor log and a coaching log stored in the data storage, and dynamically determine positive events and negative events, and generate the feedback to the operator at least partly based on the determined positive events and negative events,
   wherein the sensor log records information provided by the sensors in association with the corresponding time frame, and
   wherein the coaching log records the determined desired behavior or the determined current behavior for the corresponding time frame by the behavior module.

10. The on-vehicle system according to claim 7, wherein the behavior module configures the controller to receive information provided by the recording module and determine whether the determined desired behavior or the determined current behavior has occurred.

11. The on-vehicle system according to claim 10, wherein the coaching module configures the controller to assess the determined desired behavior or the determined current behavior for each time frame, adjust cueing thresholds and generate the feedback to the operator using the audiovisual device.

12. The on-vehicle system according to claim 10, wherein the data storage stores a coaching log recording the determined desired behavior or the determined current behavior by the behavior module.

13. The on-vehicle system according to claim 11, wherein the adjusting of the cueing thresholds is performed substantially in real-time.

14. The on-vehicle system according to claim 11, wherein the reporting module configures the controller to dynamically generate documents based on information from the recording module, the behavior module and the coaching module.

15. The on-vehicle system according to claim 14, wherein the documents generated by the reporting module are stored in the data storage.

16. The on-vehicle system according to claim 14, wherein the audiovisual display device displays information based on the documents generated by the reporting module.

17. The on-vehicle system according to claim 1, wherein the assessment of the performance of the operator is normalized based on at least one of a load, a route, a terrain profile and a vehicle specification.

18. The on-vehicle system according to claim 1, further comprising a communication device, wherein the communication device transmits information related to the operator based on the assessment to at least a remote location.

19. The on-vehicle system according to claim 18, wherein the communication device uses at least one of wired, fixed wireless, or mobile wireless information networks to communicate with the remote location.

20. The on-vehicle system according to claim 1, wherein operator cueing is included in the feedback provided to the operator.

21. The on-vehicle system according to claim 1, further comprising a communication device, wherein an alert is sent to a remote location by the communication device when the operator repeatedly fails to comply with operator cueing.

22. The on-vehicle system according to claim 1, wherein the sensors include at least one of control input sensors, vehicle position sensors, vehicle motion sensors, drive train sensors, load sensors and environment sensors.

23. The on-vehicle system according to claim 22, wherein the components of the vehicle include control input devices that receive control inputs from the operator, and the control input sensors detect or measure changes in a state of the control input devices.

24. The on-vehicle system according to claim 22, wherein at least one of the vehicle position sensors and the vehicle motion sensors detects or measures at least one of a position, an orientation, a velocity, an acceleration and changes in the operational efficiency of the vehicle.

25. The on-vehicle system according to claim 22, wherein the drive train sensors include devices that determine operating parameters of an engine and a transmission of the vehicle.

26. The on-vehicle system according to claim 22, wherein the load sensors determine or receive information of at least one of a weight and a position of a current load of the vehicle.

27. The on-vehicle system according to claim 26, wherein the information received by the load sensors include at least one of a tire pressure and a temperature in which the vehicle is operating.

28. The on-vehicle system according to claim 22, wherein the environment sensors detect or receive information of environmental conditions in which the vehicle is operating.

29. The on-vehicle system according to claim 1, wherein the environmental conditions include at least one of a temperature, a humidity, a barometric pressure, a precipitation, a terrain profile, a wind speed and a wind direction.

30. The on-vehicle system according to claim 1, wherein the audiovisual display device includes a video display, an audio transducer, and an operator-input device.

31. The on-vehicle system according to claim 1, wherein the data storage stores vehicle information, operator information and sortie information.

32. The on-vehicle system according to claim 1, wherein the data storage stores behavior information including parameters that determine whether the operator has performed the determined desired behavior for the time frame.

33. The on-vehicle system according to claim 1, wherein the data storage stores a sensor log recording information provided by the sensors in association with a corresponding time frame, and a coaching log recording operator's behaviors that occurred during a sortie.

34. The on-vehicle system according to claim 1, wherein time frame recording length is modified within the series of time frames to provide varying levels of detail regarding operator behavior.

35. The on-vehicle system according to claim 1, wherein time frame recording rate is modified within the series of time frames to provide varying levels of detail regarding operator behavior.

36. The on-vehicle system according to claim 1, wherein both time frame recording rate and time frame recording time are modified within the series of time frames to provide varying levels of detail regarding operator behavior.

37. The on-vehicle system according to claim 1, wherein the program instructions include a coaching module configured to compare behavior magnitude within the series of time frames with corresponding desired behavior information.

38. The on-vehicle system according to claim 37, wherein the program instructions include a coaching module configured to compare both behavior magnitude and behavior duration within the series of time frames with corresponding desired behavior information.

39. The on-vehicle system according to claim 1, wherein the program instructions include a coaching module configured to compare behavior duration within the series of time frames with corresponding desired behavior information.

40. An on-vehicle system for determining desired behaviors for an operator of a vehicle in at least substantially real time, the system comprising:
a plurality of sensors configured to measure or detect, in each time frame for a series of time frames, conditions of components of the vehicle, and convert the detected conditions into analog or digital information;
an audiovisual display device; a processor; and
a data storage storing program instructions, the analog or digital information from the sensors and other data;
wherein the program instructions, when executed by the processor, control the on-vehicle system to determine, for each time frame of the series of time frames, a desired behavior of the operator from a predetermined set of behavior categories based on a current operational efficiency of the vehicle determined from the analog or digital information from the sensors, the desired behavior configured to vary from a first time frame to a second time frame based on the current operational efficiency of the vehicle, and present the operator, via the audiovisual display device and for each time frame in the series of time frames, cueing based on the determined desired behavior in at least substantially real-time to optimize the operator's behavior to enhance operational efficiency of the vehicle, and to incrementally change an operator feedback threshold based on a desired performance threshold.

41. The system of claim 40, wherein the program instructions, when executed by the processor, control the on-vehicle system to store the determined desired behavior in the data storage for each time frame in the series of time frames.

42. An on-vehicle system for determining desired behaviors for operating a vehicle during a sortie in at least substantially real time, the system comprising:
 a plurality of sensors configured to measure or detect conditions of components of the vehicle, and convert the detected conditions into analog or digital information;
 an audiovisual display device; a processor; and
 a data storage storing program instructions, the analog or digital information from the sensors and other data;
 wherein the program instructions, when executed by the processor, control the on-vehicle system to determine, for each time frame of a series of time frames in the sortie, a desired behavior of an operator of the vehicle from a predetermined set of behavior categories based on a current operational efficiency of the vehicle determined from the analog or digital information from the sensors, the desired behavior configured to vary from a first time frame to a second time frame based on the current operational efficiency of the vehicle, and store, in the data storage, the determined desired behavior of the operator of the vehicle for each time frame in the series of time frames of the sortie, and to incrementally change an operator feedback threshold based on a desired performance threshold.

* * * * *